(12) United States Patent
Kashyap et al.

(10) Patent No.: US 7,348,505 B2
(45) Date of Patent: Mar. 25, 2008

(54) SHUTTER LOCKING SYSTEM FOR DRAW-OUT CIRCUIT BREAKERS AND METHOD OF ASSEMBLY THEREOF

(75) Inventors: Pavan Ramachandravitthal Kashyap, Bangalore (IN); Jeffrey Anthony Hughes, Merseyside (GB); Sapuram Sudhakar, Andhra Pradesh (IN)

(73) Assignee: General Electric Company, Schenectady, NY (US)

( * ) Notice: Subject to any disclaimer, the term of this patent is extended or adjusted under 35 U.S.C. 154(b) by 192 days.

(21) Appl. No.: 11/315,947

(22) Filed: Dec. 21, 2005

(65) Prior Publication Data

US 2007/0137991 A1    Jun. 21, 2007

(51) Int. Cl.
*H02B 1/14* (2006.01)

(52) U.S. Cl. .................. 200/50.22; 439/436
(58) Field of Classification Search ............ 200/50.22, 200/50.21
See application file for complete search history.

(56) References Cited

U.S. PATENT DOCUMENTS

| | | | |
|---|---|---|---|
| 4,773,870 A | 9/1988 | Sinnig | 439/136 |
| 5,097,382 A | 3/1992 | Leach | 361/345 |
| 5,113,043 A | 5/1992 | Morris | 200/43.01 |
| 5,196,658 A | 3/1993 | Gula | 200/50.32 |
| 5,200,585 A | 4/1993 | Davies | 200/50.22 |
| 5,343,355 A | 8/1994 | Ishikawa | 361/617 |
| 5,581,133 A | 12/1996 | Smith | 307/64 |
| 5,757,260 A | 5/1998 | Smith | 337/186 |
| 6,028,272 A | 2/2000 | Akers | 200/50.26 |

*Primary Examiner*—Renee Luebke
(74) *Attorney, Agent, or Firm*—Cantor Colburn LLP (57) ABSTRACT

A cassette for a draw-out circuit breaker apparatus is disclosed. The cassette comprises a base having a front edge and a back edge, the back edge defining a back plane, a set of shutters disposed at the back plane and configured to open and close, and a set of shutter locks extending from the front edge to the back edge and in operable communication with the set of shutters. The shutter locks are biased toward a first position. In response to the shutter locks being driven toward a second position, the shutters are restrained from opening. The shutter locks are configured to be restrained in the second position.

17 Claims, 8 Drawing Sheets

SHUTTER LOCKING SYSTEM FOR DRAW-OUT CIRCUIT BREAKERS AND METHOD OF ASSEMBLY THEREOF

BACKGROUND OF THE INVENTION

The present disclosure relates generally to draw-out circuit breakers and particularly to a shutter locking arrangement for a draw-out mechanism (also herein referred to as the cassette) of an Air Circuit Breaker.

A cassette is a mounting accessory into which a circuit breaker may be installed, having terminals to which the main electrical supply lines are connected. The cassette has shutters configured to cover the terminals, preventing contact with live terminals when the breaker is withdrawn. The shutters also lift to allow the withdrawable unit (the circuit breaker) to be easily and rapidly connected to the terminals in the cassette. A racking mechanism is used to install or remove the circuit breaker from the cassette. Many cassettes utilize shutter locks, which are secondary devices mounted close to the terminals, or front panel mounted shutter locks, which comprise many components, increasing the complexity and assembly cost of the cassette.

In view of the foregoing assembly drawbacks, the art of draw-out circuit breakers would benefit from an improved shutter locking arrangement having ease of assembly.

BRIEF DESCRIPTION OF THE INVENTION

An embodiment of the invention includes a cassette for a draw-out circuit breaker apparatus. The cassette comprises a base having a front edge and a back edge, the back edge defining a back plane, a set of shutters disposed at the back plane and configured to open and close, and a set of shutter locks extending from the front edge to the back edge and in operable communication with the set of shutters. The shutter locks are biased toward a first position. In response to the shutter locks being driven toward a second position, the shutters are restrained from opening. The shutter locks are configured to be restrained in the second position.

Another embodiment of the invention includes a method of assembling a shutter lock onto a draw-out circuit breaker apparatus. The draw-out circuit breaker apparatus comprises a cassette base and a set of shutter locks. The cassette base comprises a flange proximate to a front edge, a restrainer pin, and at least one guide post. The shutter locks comprise a keyhole at one end and a guide slot. The keyhole of each shutter lock is placed over the restrainer pin while disposing the opposite end of the shutter lock beneath the flange. The shutter lock is rotated about the restrainer pin until the guide slot is aligned with one of the at least one guide posts, and the shutter lock is translated to insert the at least one guide post into the guide slot.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention provides a cassette, which is a mounting accessory for a circuit breaker, the cassette having terminals to which main electrical supply lines are connected via distribution equipment in which the cassette is mounted. At the back of the cassette there are two shutters designed to cover the terminals, which serve to prevent contact with live terminals when the breaker is withdrawn. The shutters lift to allow the withdrawable circuit breaker to be easily and rapidly connected to the terminals.

In an embodiment, the shutters are locked in place via a shutter locking assembly consisting of two strips of sheet metal, which have hook features that engage with shutter links. These shutter locks have keyholes strategically placed, close to the hooks, to facilitate assembly and removal of the shutter locks, and to prevent translation of the shutter locks in the direction of opening shutter motion. The end opposite the hook of each shutter lock has a round hole to accept a padlock having a shackle, which may be used to secure the shutter locks in a LOCKED position. Alternatively, tabs on the shutter locks allow other locks, such as a cam lock for example, to be incorporated into the cassette to secure the shutter locks in the LOCKED position.

In an embodiment, the shutter locks block movement of a racking plate, which is configured to allow or prevent access to a racking mechanism used to insert or withdraw the circuit breaker into or out of the cassette. In response to placing the shutter locks in the LOCKED position, movement of the racking plate is prevented, thereby restricting access to the racking mechanism. In effect, by securing the shutter locks in the LOCKED position, the terminals are covered by the shutters, and access to the racking mechanism is prevented.

Figure 1:
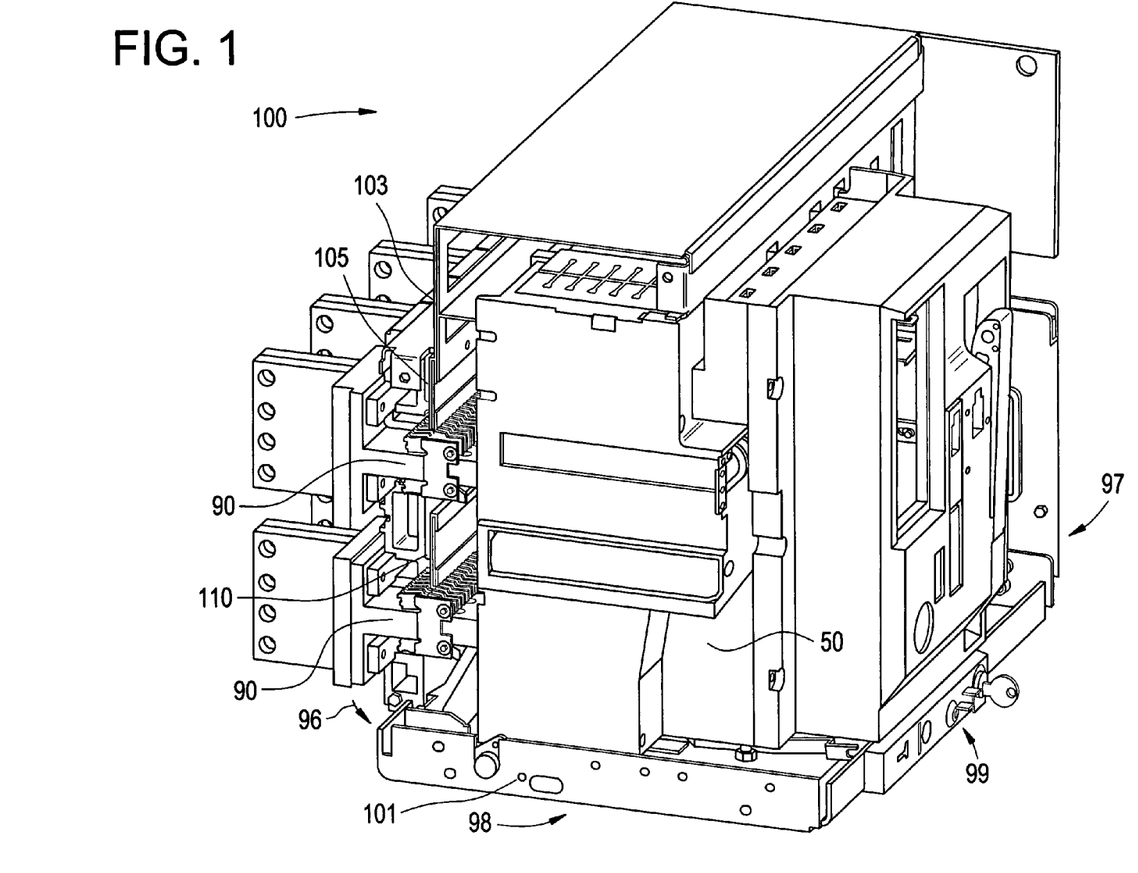
FIG. 1 depicts a top perspective view of an exemplary cassette assembly with a circuit breaker for use in accordance with an embodiment of the invention.

Referring to FIG. 1, an embodiment of a cassette 100, including a cassette base 101, a rear panel 103, line terminals 90, a top shutter 105, and a bottom shutter 110 (also herein referred to as a set of shutters) are depicted, with a draw-out circuit breaker (also herein referred to as a circuit breaker) 50 inserted. A front edge 99, left edge 98, right edge 97 and back edge 96 of the cassette base 101 are indicated. The cassette 100 is configured to support and guide the removal and installation of the circuit breaker 50 for repair or replacement in a manner well known to one skilled in the art. The back edge 96 of the cassette base 101 defines a back plane (also herein referred to as a rear panel) 103. The line terminals 90 are disposed within the rear panel 103 of the cassette 100, and provide an electrical connection to the main electrical supply lines (not shown). The terminals 90 are in physical and electrical connection with the circuit breaker 50 in response to it being in the draw-in position depicted. The shutters 105, 110 are disposed within the rear panel 103, in front of the terminals 90, and are configured via a series of mechanical links 125, 126, 130, 131, described further below, to translate vertically to either open or close, exposing or covering the line terminals 90 in response to the insertion or removal of the circuit breaker 50 into or out of the cassette 100. FIG. 1 depicts an OPEN shutter position, in which the shutters 105, 110 have exposed the line terminals 90 to allow the connection of the circuit breaker 50 to the line terminals 90.

Figure 2:
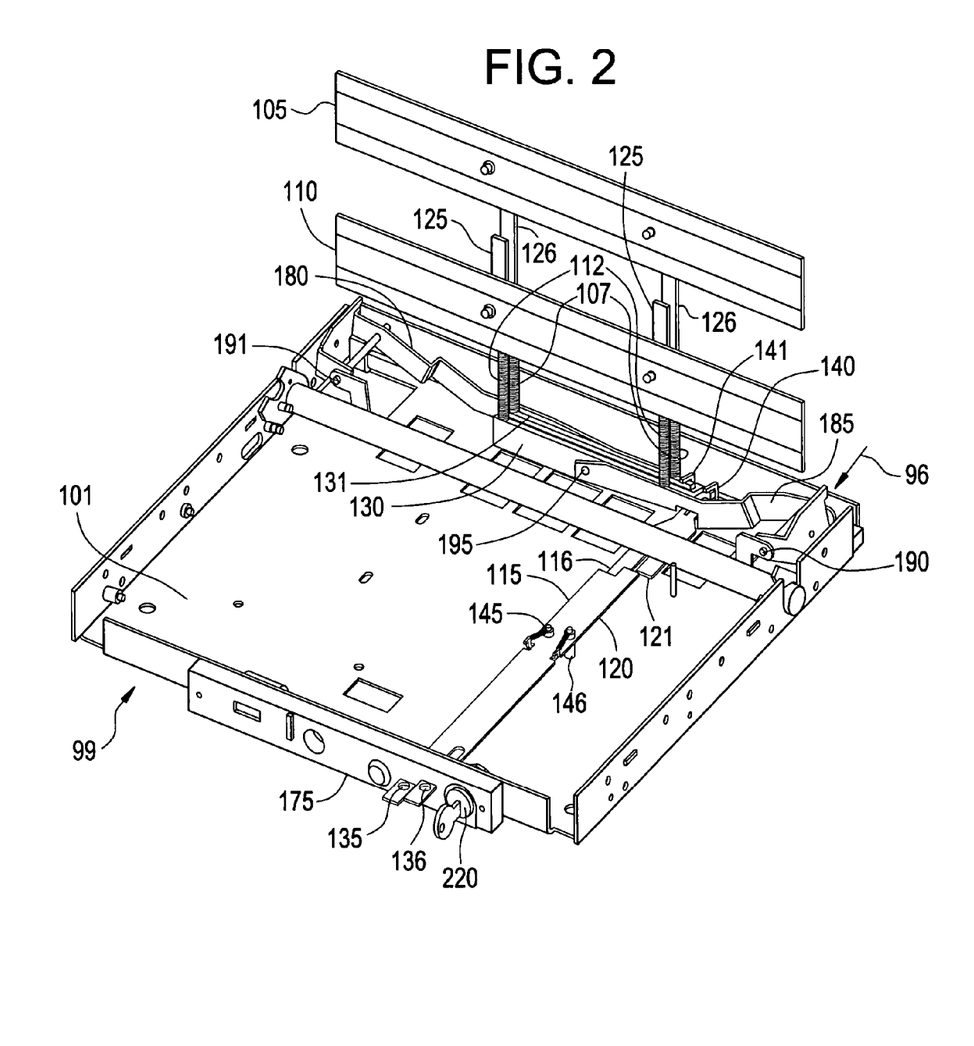
FIG. 2 depicts a top perspective view of a portion of the cassette assembly of FIG. 1.

Referring to FIG. 2, the bottom shutter 110 is attached to two lift links 125, which in turn, are attached to a lift support 130 to form one unitized, rigid structure. The bottom shutter 110 and the lift links 125 are disposed within and supported by the rear panel 103, which is configured to allow vertical translation of the bottom shutter 110, the lift links 125, and the lift support 130, to either cover or expose the terminals 90. A set of bottom shutter springs 112 are disposed surrounding the lift links 125, with one end contacting the rear panel 103, and the other end contacting the lift support 130, thereby providing a biasing force which, in the absence of other external forces, will cause the bottom shutter 110 to translate downward to a CLOSED position (as depicted in FIG. 2), thereby covering the terminals 90. It will be appreciated that the top shutter 105, two lift links 126, and a lift support 131 form a similar unitized structure that is also disposed within, and supported by, the rear panel 103, acted upon by a biasing force provided by a set of top shutter springs 107.

In an embodiment, a set of shutter locks 115, 120 are slender sheet metal strips, disposed proximate to the cassette base 101, extending from the front edge 99 to the back edge 96. The shutter locks 115, 120 are capable to translate toward the back edge 96 of the cassette base 101 to an UNLOCKED position (also herein referred to as a first position) or toward the front edge 99 of the cassette base 101 to a LOCKED position (also herein referred to as a second position). A set of locking hooks 140, 141 are disposed at one end of each of the shutter locks 115, 120 (proximate to the back edge 96), and a set of locking holes 135, 136, which are configured to accept a padlock shackle, are disposed at the other end of the shutter locks 115, 120. In an embodiment, the padlock has a six to eight millimeter shackle diameter. It may be seen that the shutter locks 115, 120 are depicted in FIG. 2 disposed such that the locking hooks 140, 141 are engaged with the lift supports 130, 131, and the locking holes 135, 136 are accessible, thereby defining the LOCKED position. In response to the engagement of the locking hooks 140, 141 with the lift supports 130, 131, the shutters 105, 110 are constrained in the CLOSED position, covering the terminals 90.

A front panel 175 is attached to the front edge 99 of the cassette base 101. It may be appreciated that in response to the insertion of a padlock shackle into the locking holes 135, 136, an interference between such padlock shackles and the front panel 175 will prevent translation of the shutter locks 115, 120 toward the back edge 96 of the cassette base 101, thereby securing the shutter locks 115, 120 in the LOCKED position, and in turn, the shutters 105, 110 in the CLOSED position. While an embodiment of the invention has been described employing locking hooks 140, 141, it will be appreciated that the scope of the invention is not so limited, and that the invention also applies to a locking arrangement using other means of shutter 105, 110 retention, such as pin and hole arrangement, for example.

Figure 3:
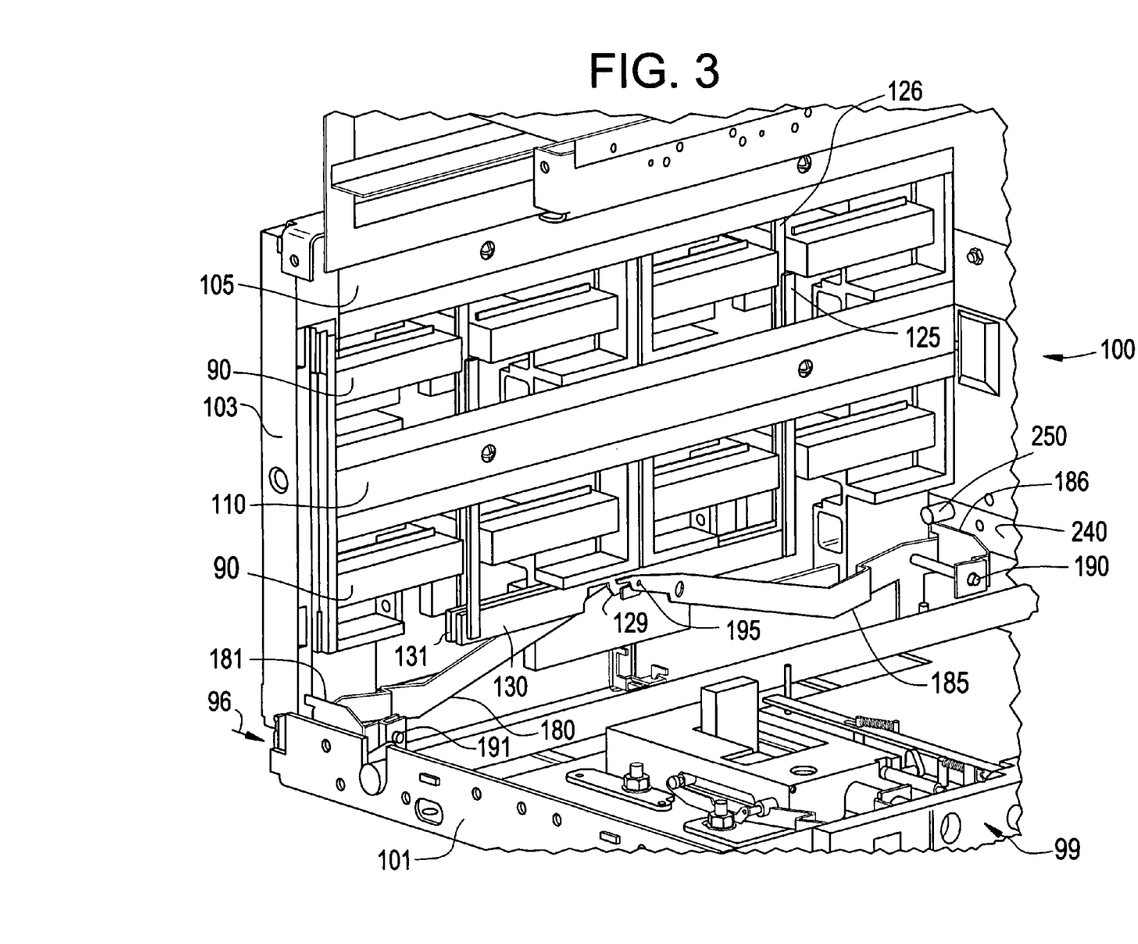
FIG. 3 depicts a partial top perspective view of the cassette assembly of FIG. 1 with the circuit breaker removed.

A set of lift arms 180, 185 are disposed upon, and pivotally arranged with two lift arm pivots 190, 191, which are attached to the cassette base 101. Referring now to FIG. 3, a partial view of an embodiment of the cassette 100 (with the circuit breaker 50 removed) is depicted including a side rail 240, a rail pin 250, lift arm drive surfaces 181, 186, and the set of line terminals 90. Note that for clarity the left side of the cassette 100 (including a side rail 241 and a rail pin 251) have been removed. In the embodiment depicted in FIG. 3, the shutters 105, 110, the lift supports 130, 131, the lift links 125, 126, and the lift arms 180, 185, are disposed in the OPEN position, corresponding to the installation of the circuit breaker 50, thereby exposing the terminals 90.

In response to the installation of the circuit breaker 50 into the cassette 100, the circuit breaker 50 will engage the side rail 240, which is contained within the right side of the cassette 100, causing the side rail 240 to translate toward the back edge 96 of the cassette base 101 with the circuit breaker 50. The rail pin 250 is attached to the side rail 240, and is configured to engage with the drive surface 186 of the right lift arm 185. The engagement of the rail pin 250 with the drive surface 186 will force the drive surface 186 downward. The downward translation of the drive surface 186 will result in a clockwise rotation of the lift arm 185 about the lift arm pivot 190 that will cause a lift arm pin 195, which is fastened to the lift arm 185, to translate upwards. The lift arm pin 195 is engaged within a slot 129 in the lift support 130, thereby raising the lift support 130 in response to the clockwise rotation of the lift arm 185. The rise of the lift support 130 will, in turn, raise the lift links 125 and the bottom shutter 110, which are fastened together as a unitized structure. It will be appreciated that a similar relationship exists between the left side rail 241, the lift pin 251, the drive surface 181, the left lift arm 180, a lift arm pin 196 (not visible in the perspective of FIG. 8), the lift support 131, the lift links 126, and the top shutter 105. While an embodiment of the invention has been depicted employing four sets of terminals 90, and the set of pivotal lift arms 180, 185, it will be appreciated that the scope of the invention is not so limited, and that the invention also applies to alternate embodiments, which may utilize cassettes 100 with other numbers of sets of terminals 90, such as three, or alternate methods of shutter 105, 110 displacement, such as a set of sliding lift arms, for example.

Figure 4:
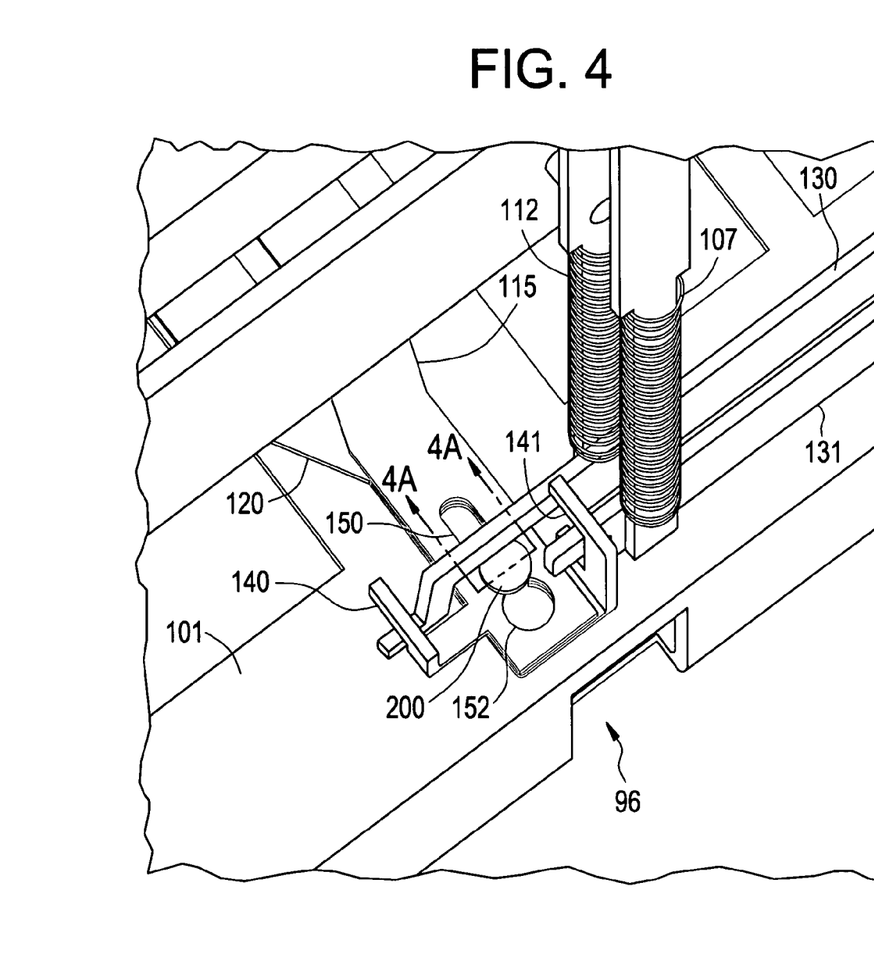
FIG. 4 depicts a partial top perspective view of an exemplary shutter locking arrangement in accordance with an embodiment of the invention.
Figure 4A:
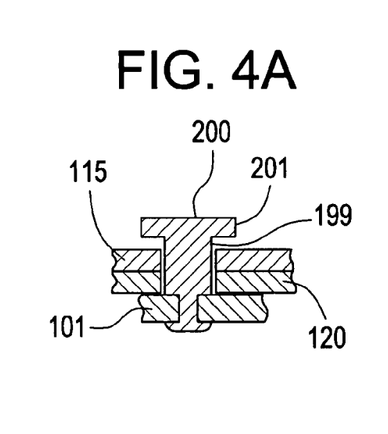

Referring now to FIG. 4, a restrainer pin 200 fixedly attached to the cassette base 101 is depicted, with the shutter locks 115, 120 in the LOCKED position. FIG. 4A depicts a cross section view of the restrainer pin 200 attached to the cassette base 101. The restrainer pin 200 is disposed proximate to the back edge 96, has a head 201 that is configured to fit through a set of keyholes 152, 153, but is larger than a set of slots 150, 151, in the shutter locks 115, 120. As used herein, the term "keyhole" will also be used to refer to the shaped hole provided by keyholes 152, 153 and slots 150, 151. A shaft 199 of the restrainer pin 200 is configured to fit within the slots 150, 151 and, in conjunction with the orientation of the slots 150, 151, is configured to define the translational freedom of the shutter locks 115, 120. It will be appreciated that because the second shutter lock 115 is depicted disposed above the first shutter lock 120, the slot 151 and the keyhole 153 are not readily visible in FIG. 4.

During normal operating conditions, the range of the shutter lock 115, 120 motion, from the LOCKED position, to the UNLOCKED position is such that the restrainer pin 200 remains within the slots 150, 151. Because the head 201 is larger than the slots 150, 151, movement of the shutter locks 115, 120 orthogonal to the cassette base 101 is constrained.

As described above, in response to the removal of the circuit breaker 50 from the cassette 100, the biasing force from the shutter springs 107, 112 will tend to displace the shutters 105, 110 downward to the CLOSED position. An exemplary embodiment in FIG. 4 is depicted with the shutter locks 115, 120 in the LOCKED position, as defined by the engagement of the locking hooks 140, 141 with the lift supports 130, 131. The shutter locks 115, 120 are configured to each independently translate, and therefore, engage one of the lift supports 130, 131. Because motion of the shutter locks 115, 120 orthogonal to the cassette base 101 is prevented by the restraining pin 200, engagement of the locking hooks 140, 141 with the lift supports 130, 131 will prevent the rise of the lift supports 130, 131, thereby locking the shutters 105, 110 in the CLOSED position. Although the embodiment is depicted in FIG. 4 with the shutter locks 105, 110 in the LOCKED position, it will be appreciated that the shutter locks 105, 110 may be also be translated toward the back edge 96 of the cassette base 101 to the UNLOCKED position, to disengage the locking hooks 140, 141 from the lower lift supports 130, 131. While an embodiment of the invention has been described employing the keyholes 152, 153 and the slots 150, 151, it will be appreciated that the scope of the invention is not so limited, and that the invention also applies to alternate embodiments, which may utilize other methods to guide and restrict motion, such as slide channel, for example.

Figure 5:
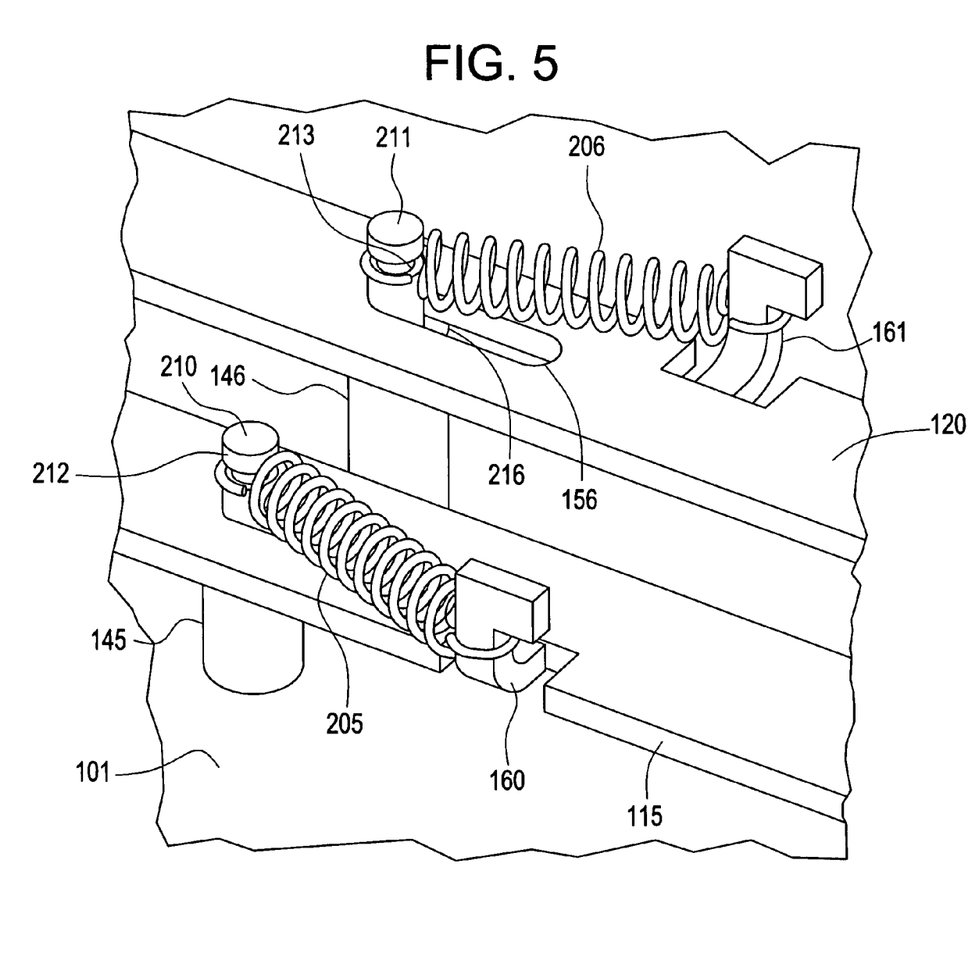
FIG. 5 depicts a top perspective enlarged view of an exemplary shutter locking spring return arrangement in accordance with an embodiment of the invention.

Referring now to FIG. 5, the shutter locks 115,120 are depicted disposed in the LOCKED position with a set of grooved shoulder pins 145, 146 fixedly attached to the cassette base 101, the grooved shoulder pins 145,146 disposed between the back edge 96 and the front edge 99. The grooved shoulder pins 145, 146 are configured with a set of posts 210, 211 to fit within a set of guide slots 155, 156 contained within the shutter locks 115, 120. The grooved shoulder pins 145, 146 also comprise a set of grooves 212, 213, configured to retain a set of biasing springs 205, 206. A set of shoulders 215, 216, which are larger than the guide slots 155, 156, provide surfaces to prevent motion of the shutter locks 115, 120 in an orthogonal direction toward the cassette base 101. It will be appreciated that the shoulder 215 (disposed on the grooved shoulder pin 145) and the guide slot 156 (disposed through the shutter lock 115) are not visible in the perspective of FIG. 5. The orientation and length of the guide slots 155, 156 is configured, in conjunction with the posts 210, 211, to guide and limit the translational motion of the shutter locks 115, 120 within the plane of the cassette base 101, thereby defining the extremes of the LOCKED and UNLOCKED positions.

The biasing springs 205, 206 are attached between a set of spring hooks 160, 161 and the grooves 212, 213. The spring hooks 160, 161 are integral shutter lock 115, 120 features, disposed proximate to the guide slots 155, 156, and shaped to retain the end of the biasing springs 205, 206. The biasing springs 205, 206 provide a force to bias the shutter locks 115, 120 toward the back edge 96 of the cassette base 101, to the UNLOCKED position. Accordingly, without an external force such as a user pulling on the shutter locks, 115, 120, or a padlock shackle engaged with the locking holes 135, 136 for example, the force provided by the biasing springs 205, 206 will cause the shutter locks 115, 120 to translate rearward, to the UNLOCKED (first) position. Referring briefly back to FIG. 2, in response to the translation of the shutter locks 115, 120 to the UNLOCKED position, the locking holes 135, 136 will be withdrawn behind the front panel 175 and will not be accessible for padlocking. While an embodiment of the invention has been described employing extension springs 205, 206 to provide a biasing force to the shutter locks 115, 120, it will be appreciated that the scope of the invention is not so limited, and that the invention also applies to alternate embodiments which may use other means to provide a bias force, such as compression or leaf springs, for example.

Figure 6:
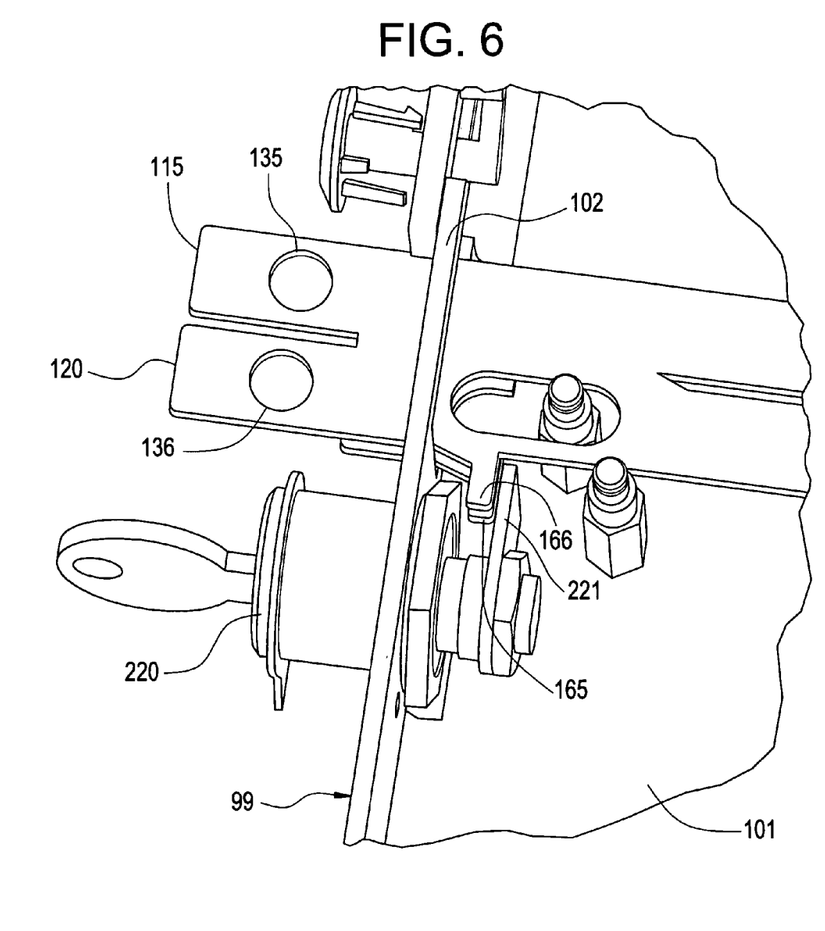
FIG. 6 depicts a top perspective enlarged view of an exemplary arrangement to secure the shutter locks in accordance with an embodiment of the invention.

Also depicted in FIG. 2, the front panel 175 is attached to the front edge 99 of the cassette base 101, and may contain a cam lock 220, configured to secure the shutter locks 115, 120 in the LOCKED position. Referring now to FIG. 6, a cam 221 of the cam lock 220 is depicted. The cam 221 is fixedly attached to the cam lock 220, and is free to rotate in response to the operation of the cam lock 220. In this exemplary embodiment, the shutter locks 115, 120 are translated toward the front edge 99 of the cassette base 101, to the LOCKED position. The cam 221 is depicted disposed to interfere with a set of tabs 165, 166, which are an extended feature of the shutter locks 115, 120. The cam 221 is attached to the cam lock 220, which is attached to the cassette base 101. Therefore, the force provided to the shutter locks 115, 120 by the biasing springs 205, 206 will be transmitted through the tabs 165, 166, the cam 221, the cam lock 220, and finally reacted by the cassette base 101 to secure the shutter locks 115, 120 in the LOCKED (second) position. It will be appreciated that although FIG. 6 depicts the cam 221 of the cam lock 220 positioned to interfere with the tabs 165, 166, the cam 221 may also be positioned (by operation of the cam lock 220) to not interfere with the tabs 165, 166, thereby allowing unobstructed motion of the shutter locks 115, 120. While the embodiment described herein depicts the use of the cam lock 220 to secure the shutter locks 115, 120 in the LOCKED position, it will be appreciated that the disclosed invention is also applicable to other methods to secure the shutter locks 115, 120 in the LOCKED position, such as a pin and hole arrangement, for example.

Figure 7:
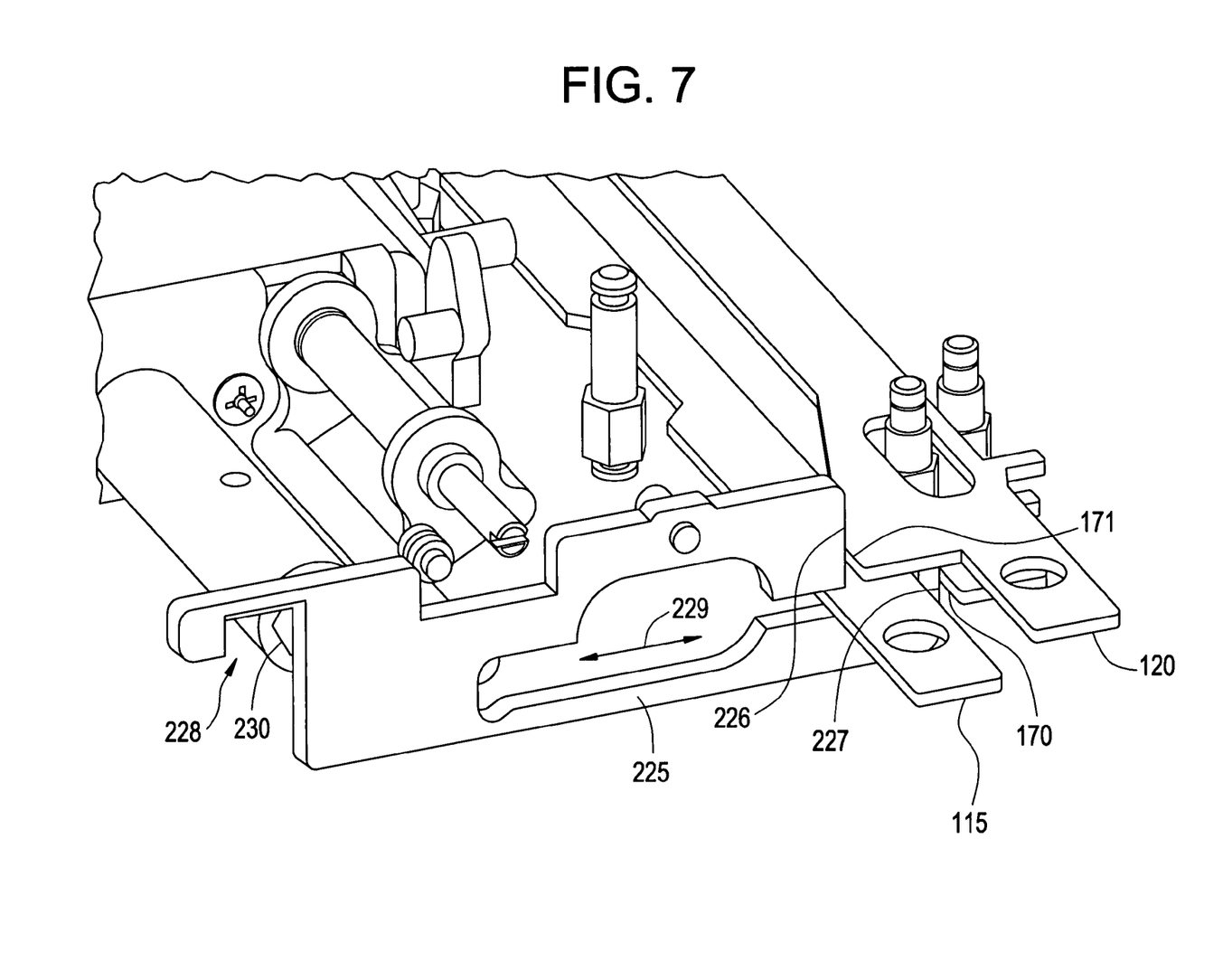
FIG. 7 depicts a partial top perspective view of an exemplary arrangement to secure access to a racking mechanism in accordance with an embodiment of the invention.

Referring now to FIG. 7, an embodiment is depicted with a racking actuator 230, and a racking plate 225, which comprises an aperture 228, and a set of racking plate lock surfaces 226, 227. The racking actuator 230 is disposed proximate to the front panel 175, and comprises a hex head to interface with standard hexagonal sockets to operate a racking mechanism (not depicted), which is used to insert or remove the circuit breaker 50 in a manner well known to one skilled in the art. The racking plate 225 is contained within the front panel 175, and may translate horizontally, as indicated by direction line 229. In response to the translation of the racking plate 225, the aperture 228 may either provide or prevent access to the racking actuator 230 during maintenance when the circuit breaker 50 is racked out (removed from the electrical supply lines).

In response to the shutter locks 115, 120 being in the LOCKED position, a set of interference surfaces 170, 171 will contact the racking plate lock surfaces 226, 227 to prevent translation of the racking plate 225 to the right, thereby holding the racking plate 225 in a first position, causing the racking plate 225 to restrict access to the racking actuator 230. It will be appreciated that while FIG. 7 depicts the shutter locks 115, 120 in the LOCKED position, thereby preventing translation of the racking plate 225, that, in response to the shutter locks 115, 120 being disposed in the UNLOCKED position, the racking plate 225 will be capable of translation to the right to a second position, thereby allowing the aperture 228 to provide access to the racking actuator 230 to rack the circuit breaker 50 in or out of the cassette 100. Accordingly, the configuration of the racking plate 225, in conjunction with padlock shackles or the cam lock 220 to secure the shutter locks 115, 120 in the LOCKED position, will also restrict access to the racking actuator 230. While the embodiment described herein depicts the surfaces 170, 171, 226, 227 to prevent translation of the racking plate 225, it will be appreciated that the disclosed invention is also applicable to other methods to prevent the translation of the racking plate 225, such as a pin and hole arrangement, for example.

Figure 8A:
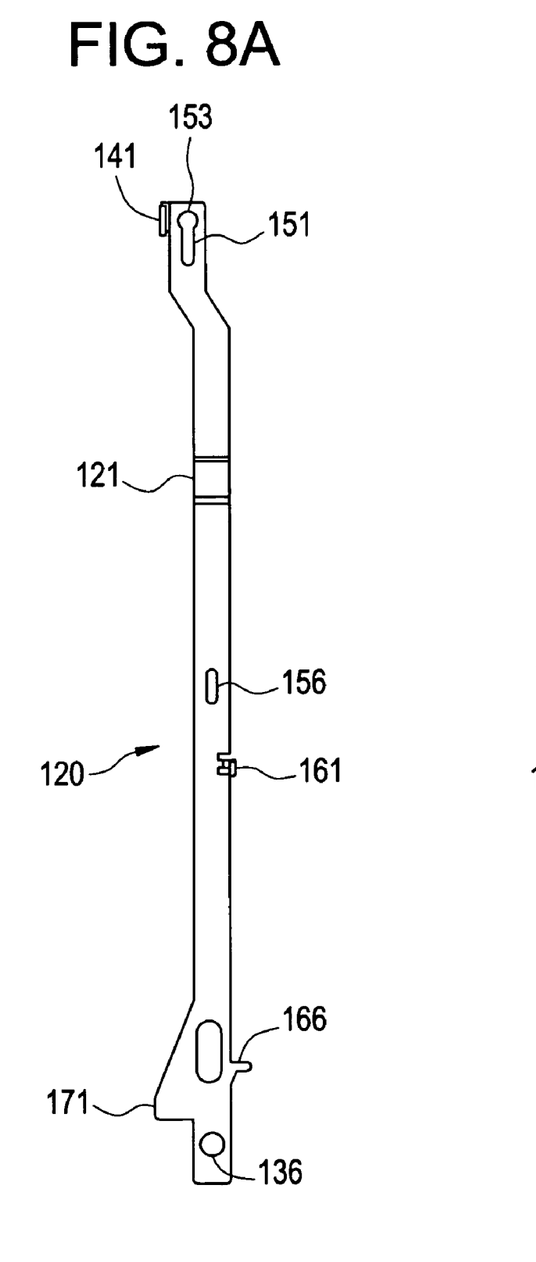
FIG. 8 depicts a plan view of two exemplary shutter locks in accordance with an embodiment of the invention.
Figure 8B:
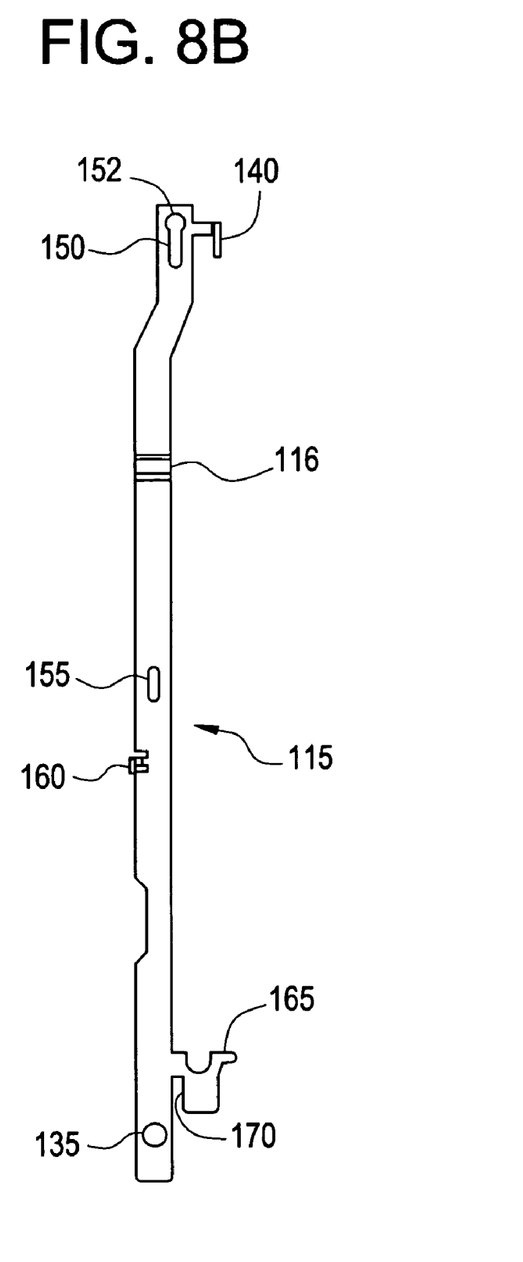

Referring now to FIG. 8, full top views of exemplary embodiments depict the shutter lock 115, 120 features, which were previously depicted only in isolation via partial views. The slots 150, 151, the keyholes 152, 153, the guide slots 155, 156, the spring hooks 160, 161, the tabs 165, 166, and the interference surfaces 170, 171 are depicted. Each shutter lock also has a bend 116, 121 (which is more clearly depicted in FIG. 2) to raise the front end of shutter locks 115, 120 away from the surface of the cassette base 101.

Accordingly, assembly of the shutter locks 115, 120 onto the cassette base 101 will now be discussed with reference to FIGS. 2, 4, 5, and 6.

Referring to FIG. 4, the keyholes 152, 153, in conjunction with the restrainer pin 200, are configured to provide easy assembly and removal of the shutter locks 115, 120. Assembly begins with the placement of the keyhole 153 over the head 201 of the restrainer pin 200. Referring briefly to FIG. 6, the end of the shutter lock 120 opposite the keyhole 153 must be disposed beneath a flange 102 disposed at the front edge 99 of the cassette base 101, behind the front panel 175. Referring now to FIG. 2, the shutter lock 120 may be rotated in a counter clockwise direction about the restrainer pin 200 to align the guide slot 156 with the post 211. Referring now to FIG. 5, in response to the guide slot 156 being aligned with the post 211, the shutter lock 120 may be translated toward the back edge 96 of the cassette base 101 and downward, toward the cassette base 101, to assemble the guide slot 156 over the post 211, allowing the shutter lock 120 to rest upon the shoulder 216. Note that if the shutter lock 120 is not disposed beneath the flange 102 of the cassette base 101, the shutter lock 120 will not properly rest upon the shoulder 216.

Referring again to FIG. 4, assembly continues with the placement of the keyhole 152 of the shutter lock 115 over the head 201 of the restrainer pin 200. Referring briefly to FIG. 6, the end of the shutter lock 115 opposite the keyhole 152 must be disposed beneath the flange 102. Referring now to FIG. 2, the shutter lock 115 may be rotated in a counter clockwise direction about the restrainer pin 200 to align the elongated guide slot 155 with the post 210. Referring now to FIG. 5, in response to the guide slot 155 being aligned with the post 210, the shutter lock 115 may be translated toward the back edge 96 of the cassette base 101 and downward, toward the cassette base 101, to assemble the guide slot 155 over the post 210, allowing the shutter lock 115 to rest upon the shoulder 215. Note that if the shutter lock 115 is not disposed beneath the flange 102 of the cassette base 101, the shutter lock 115 will not properly rest upon the shoulder 215 surface. The biasing springs 205, 206 are each attached to the spring hooks 160, 161, and then extended to be attached to the grooves 212, 213. A confirmation of the biasing action of the springs 205, 206 concludes assembly of the shutter locks 115, 120 onto the cassette base 101.

To operate the shutter locks 115, 120 following the removal of a circuit breaker 50 and positioning of the racking plate 225 to prevent access to the racking mechanism 230, the shutter locks 115, 120 may be manually withdrawn to the LOCKED position via the ends of the shutter locks 115, 120 that protrude out of the front of the front panel 175 until the posts 210, 211 that slide within the guide slots 155, 156 positively stop the shutter locks 115, 120. In response to the translation of the shutter locks 115, 120 to the LOCKED position, the locking holes 135, 136 will be accessible to the operator and the shutter locks 115, 120 may be secured in the LOCKED position with padlock shackles. In an embodiment, the padlock shackle has a six to eight millimeter diameter. Alternatively, the shutter locks 115, 120 may be secured in the LOCKED position via the operation of an optional cam lock 220 disposed within the front panel 175.

As disclosed, some embodiments of the invention may include some of the following advantages: the ability to lock the shutters of the cassette with a small number of parts within the locking arrangement; the ability to reduce cassette cost and assembly time; the ability to secure the shutter locks and racking mechanism access via the front panel or fascia of the cassette; and, the ability to secure the shutter locks and racking mechanism access using standard padlocks of six to eight millimeter shackle diameter or a self-contained cam lock.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A cassette for a draw-out circuit breaker apparatus, comprising:
  a base having a front edge and a back edge, the back edge defining a back plane;
  a set of shutters disposed at the back plane and configured to open and close; and
  a set of shutter locks extending from the front edge to the back edge and in operable communication with the set of shutters;
  wherein the shutter locks are biased toward a first position;
  wherein in response to the shutter locks being driven toward a second position, the shutters are restrained from opening; and wherein the shutter locks are configured to be restrained in the second position.

2. The cassette of claim 1, further comprising:

a restrainer pin fixedly attached to the base proximate to the back edge; and at least one shoulder pin fixedly attached to the base and disposed between the back edge and the front edge;

wherein the shutter locks each further comprise a keyhole disposed proximate to the back edge, and a guide slot disposed to interface with the at least one shoulder pin;

wherein each keyhole is shaped to provide ease of assembly of the shutter locks onto the restrainer pin and to restrain the shutter locks by the restrainer pin.

3. The cassette of claim 2, wherein:

the geometry of the keyhole guides translation within the plane of the base and restricts translation orthogonal to the base; and the geometry of the guide slot limits translation within the plane of the base.

4. The cassette of claim 3, wherein:

the length of the guide slot defines the first and second positions of the shutter locks.

5. The cassette of claim 2, wherein:

each shutter further comprises a set of supports fixedly attached thereto;

the shutter locks each further comprise a locking hook disposed proximate to the back edge of the base; and in response to the shutter locks being disposed to the second position, the locking hooks engage with the set of supports to prevent motion of each shutter.

6. The cassette of claim 2, further comprising:

a set of biasing springs;

wherein the shutter locks each further comprise a spring hook;

wherein at least one of the set of biasing springs is attached between each spring hook and the at least one shoulder pin;

wherein the set of biasing springs bias the shutter locks toward the first position.

7. The cassette of claim 1, further comprising:

a front panel disposed at the front edge.

8. The cassette of claim 7, further comprising:

a cam lock disposed within the front panel;

wherein the shutter locks each further comprise a tab disposed proximate to the front edge; and wherein the cam lock is configured to cam into interference with the tabs, thereby providing for restraint of the shutter locks in the second position.

9. The cassette of claim 7, wherein:

the shutter locks each further comprise locking holes disposed proximate to the front edge of the cassette;

in response to the shutter locks being disposed in the first position, the locking holes are at least partially withdrawn behind the front panel;

in response to the shutter locks being disposed in the second position, the locking holes are substantially accessible; and in response to the insertion of a padlock shackle through each of the locking holes, the shutter locks are restrained in the second position.

10. The cassette of claim 7, further comprising:

a racking actuator disposed proximate the to front panel for racking the draw-out circuit breaker in and out of the cassette; and a racking plate contained within the front panel, capable of horizontal translation from a first position to a second position;

wherein in response to the racking plate being disposed in its first position, access to the racking actuator is restricted; and wherein in response to the racking plate being disposed in its second position, access to the racking actuator is permitted.

11. The cassette of claim 10, wherein:

the racking plate further comprises an aperture to allow access to the racking actuator.

12. The cassette of claim 11, wherein:

the shutter locks each further comprise a set of interference surfaces disposed proximate to the front edge; and wherein the interference surfaces are configured to restrict translation of the racking plate in response to the shutter locks being disposed in the second position.

13. The cassette of claim 12, wherein:

in response to the shutter locks being disposed in the second position, the interference surfaces restrain the racking plate in its first position, thereby restricting access to the racking actuator.

14. A method of assembling a shutter lock onto a draw-out circuit breaker apparatus, the draw-out circuit breaker apparatus comprising a cassette base and a set of shutter locks, the cassette base comprising a flange proximate to a front edge, a restrainer pin, and at least one guide post, the shutter locks comprising a keyhole at one end and a guide slot, the method comprising:

for each shutter lock, placing the keyhole of the shutter lock over the restrainer pin while disposing the opposite end of the shutter lock beneath the flange, rotating the shutter lock about the restrainer pin until the guide slot is aligned with one of the at least one guide post, and translating the shutter lock to insert the at least one guide post into the guide slot.

15. The method of assembly of claim 14, wherein the at least one guide post further comprises a shoulder, and wherein:

the inserting the at least one guide post into the guide slot further comprises placing the shutter lock onto the shoulder of the at least one guide post.

16. The method of assembly of claim 14, wherein the set of shutter locks comprises a first shutter lock and a second shutter lock, and wherein:

the placing further comprises placing the first shutter lock over the restrainer pin prior to placing the second shutter lock over the restrainer pin.

17. The method of assembly of claim 14, wherein the draw-out circuit breaker apparatus further comprises a set of biasing springs, each shutter lock further comprises a spring hook, and the at least one guide post further comprises a groove, and wherein:

for each shutter lock, at least one spring is placed between the spring hook and the groove to cause each shutter lock to be biased toward a first position.

* * * * *